US011857977B2

(12) United States Patent
Wang et al.

(10) Patent No.: US 11,857,977 B2
(45) Date of Patent: Jan. 2, 2024

(54) FIXING CLAMP FOR MICROFLUIDIC CHIP

(71) Applicant: Tsinghua University, Beijing (CN)

(72) Inventors: Moran Wang, Beijing (CN); Wenhai Lei, Beijing (CN)

(73) Assignee: Tsinghua University, Beijing (CN)

( * ) Notice: Subject to any disclaimer, the term of this patent is extended or adjusted under 35 U.S.C. 154(b) by 751 days.

(21) Appl. No.: 17/003,187

(22) Filed: Aug. 26, 2020

(65) Prior Publication Data

US 2021/0060570 A1 Mar. 4, 2021

(30) Foreign Application Priority Data

Aug. 28, 2019 (CN) ........................ 201910801183.X

(51) Int. Cl.
*B01L 9/00* (2006.01)

(52) U.S. Cl.
CPC ........... *B01L 9/527* (2013.01); *B01L 2200/10* (2013.01)

(58) Field of Classification Search
CPC ............................. B01L 9/527; B01L 2200/10
USPC ....................................................... 73/864.91
See application file for complete search history.

(56) References Cited

U.S. PATENT DOCUMENTS 8,900,529 B2 12/2014 Shaikh et al.

FOREIGN PATENT DOCUMENTS

CN 101303327 11/2008
CN 103386345 11/2013
CN 103386345 A * 11/2013
CN 105344404 2/2016
CN 206937137 1/2018

OTHER PUBLICATIONS

CN Office Action dated Mar. 4, 2020 for CN 201910801183.X.
CN Notice to Go Through Registration Formalities issued Jul. 6, 2020 for CN 201910801183.X.

* cited by examiner

*Primary Examiner* — John Fitzgerald
*Assistant Examiner* — Rodney T Frank
(74) *Attorney, Agent, or Firm* — Thomas | Horstemeyer, LLP

(57) ABSTRACT

A fixing clamp for a microfluidic chip includes a set of sub-clamps arranged to be spaced apart on left and right. Each of the sub-clamps includes an upper plate body with a first passage, the first passage having a first outer interface and a first chip docking port, and the first chip docking port being located on a lower surface of the upper plate body and at one end of the upper plate body facing the other sub-clamp; a lower plate body with a second passage, the second passage having a second outer interface and a second chip docking port, and the second chip docking port being located on an upper surface of the lower plate body and at one end of the lower plate body facing the other sub-clamp; and a spacing adjusting mechanism connecting the upper plate body and the lower plate body together.

20 Claims, 3 Drawing Sheets

FIXING CLAMP FOR MICROFLUIDIC CHIP

CROSS-REFERENCE TO RELATED APPLICATION

This application claims the priority to Chinese patent application No. 201910801183.X filed Aug. 28, 2019, the entirety of which is hereby incorporated by reference.

TECHNICAL FIELD

The present application relates to the field of microfluidic chip technology, in particular to a fixing clamp for a microfluidic chip.

BACKGROUND

Microfluidic chip technology has been widely used in biomedical detection, petroleum exploration and development, environmental science and other fields. Microfluidic chip experiment can carry out complex experimental processes, such as sampling, separation, detection and chemical reaction in tiny chip areas. Besides, microfluidic chip experiment is also a powerful means to study pore scale multiphase flow mechanism, which has many advantages, such as visualization, controllability and repeatability, and is widely used in petroleum exploration and development, environmental science and other researches.

At present, there are two kinds of microfluidic chips commonly used, one is flexible microfluidic chips made of polymer materials, such as dimethyl siloxane (PDMS); and the other is hard microfluidic chips made of materials, such as silicon wafer, glass, polymethylmethacrylate (PMMA). The flexible microfluidic chip can be deformed, and a hard conduit can be directly inserted into the microfluidic chip. However, if the pressure is too high during use, the conduit will easily fall off the microfluidic chip. Moreover, after repeated use, the connection between the microfluidic chip and the conduit is no longer tight, and the debris of PDMS falling into a flow channel will also affect the normal use of the microfluidic chip. The hard microfluidic chip is often bonded with flat joints, but the bonded microfluidic chip can only be used once, and the bonding process may pollute the channels of the microfluidic chip and cause the failure of the microfluidic chip.

In order to enable the microfluidic chip to be used repeatedly, the microfluidic chip may be clamped and fixed by two sets of upper cover plates and lower cover plates. The upper cover plates at the left end and the right end are both connected with a plurality of conduits. When the microfluidic chip is manufactured, the upper surface at the left end and the upper surface at the right end thereof are both correspondingly provided with a plurality of connecting ports (limited by the size of the connection between the conduit and the upper plate body, a certain interval is required between adjacent connecting ports at either end). A plurality of connecting ports at the left end are correspondingly communicated with a plurality of connecting ports at the right end through a plurality of channels inside the microfluidic chip. A plurality of conduits at the left end are communicated with a plurality of connecting ports on the upper surface at the left end of the microfluidic chip through the upper cover plate at the left end in a one-to-one correspondence manner; and a plurality of conduits at the right end are communicated with a plurality of connecting ports on the upper surface at the right end of the microfluidic chip through the upper cover plate at the right end in a one-to-one correspondence manner, so as to carry out experiments (liquid can be supplied from one end and discharged from the other end). However, arranging a plurality of connecting ports with certain interval at the left and right ends of the upper surface of the microfluidic chip requires a larger area of the microfluidic chip, and the area of the microfluidic chip is directly related to its price, which leads to higher experimental cost of the microfluidic chip. Therefore, it is an urgent technical problem for a person skilled in the art to not only arrange a plurality of connecting ports meeting the experiment at both ends of the microfluidic chip but also reduce the area of the microfluidic chip.

SUMMARY

In order to solve at least one of the above technical problems, this application provides a fixing clamp for a microfluidic chip, which is matched with the microfluidic chip used that can be arranged with a plurality of connecting ports meeting the experiment at both ends, and the area of the microfluidic chip is smaller.

A fixing clamp for a microfluidic chip provided by an embodiment of the present disclosure includes a set of sub-clamps arranged to be spaced apart on left and right. Each of the sub-clamps includes an upper plate body having a first passage, the first passage having a first outer interface and a first chip docking port, and the first chip docking port being located on a lower surface of the upper plate body and at one end of the upper plate body facing the other sub-clamp; a lower plate body having a second passage, the second passage having a second outer interface and a second chip docking port, and the second chip docking port being located on an upper surface of the lower plate body and at one end of the lower plate body facing the other sub-clamp; and a spacing adjusting mechanism for connecting the upper plate body and the lower plate body together and adjusting a spacing between the upper plate body and the lower plate body.

Additional features and advantages of this application will be set forth in the description which follows, and in part will be obvious from the description, or may be learned by implementing this application. The objects and other advantages herein can be realized and obtained by the structure particularly indicated in the description, claims and drawings.

BRIEF DESCRIPTION OF DRAWINGS

The drawings are used to provide a further understanding of the technical schemes herein, and constitute a part of the description. They are used together with the embodiments of the present application to explain the technical schemes herein, and do not constitute a restriction on the technical schemes herein.

Figure 1:
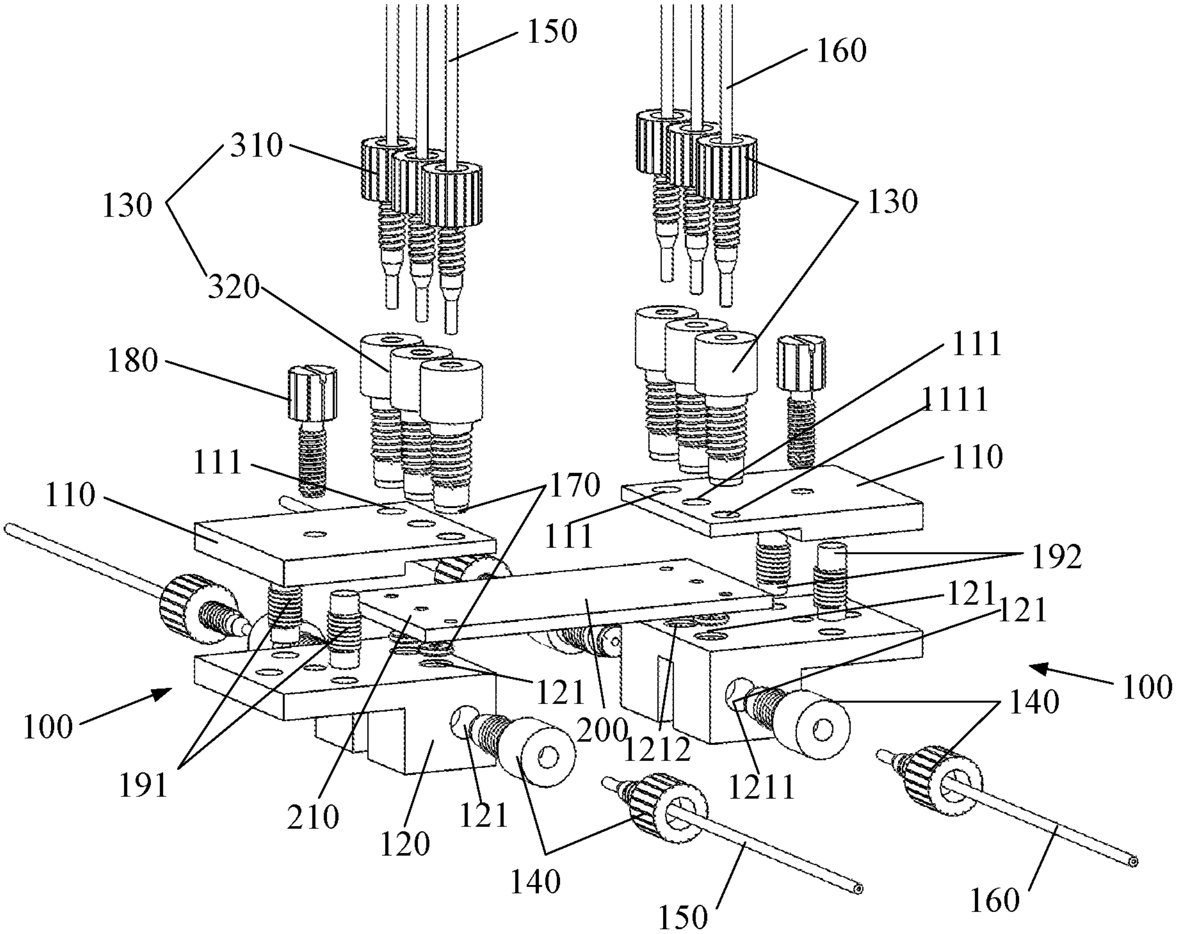
FIG. 1 is a schematic exploded structural diagram of a fixing clamp for a microfluidic chip according to an embodiment of the present disclosure.
Figure 2:
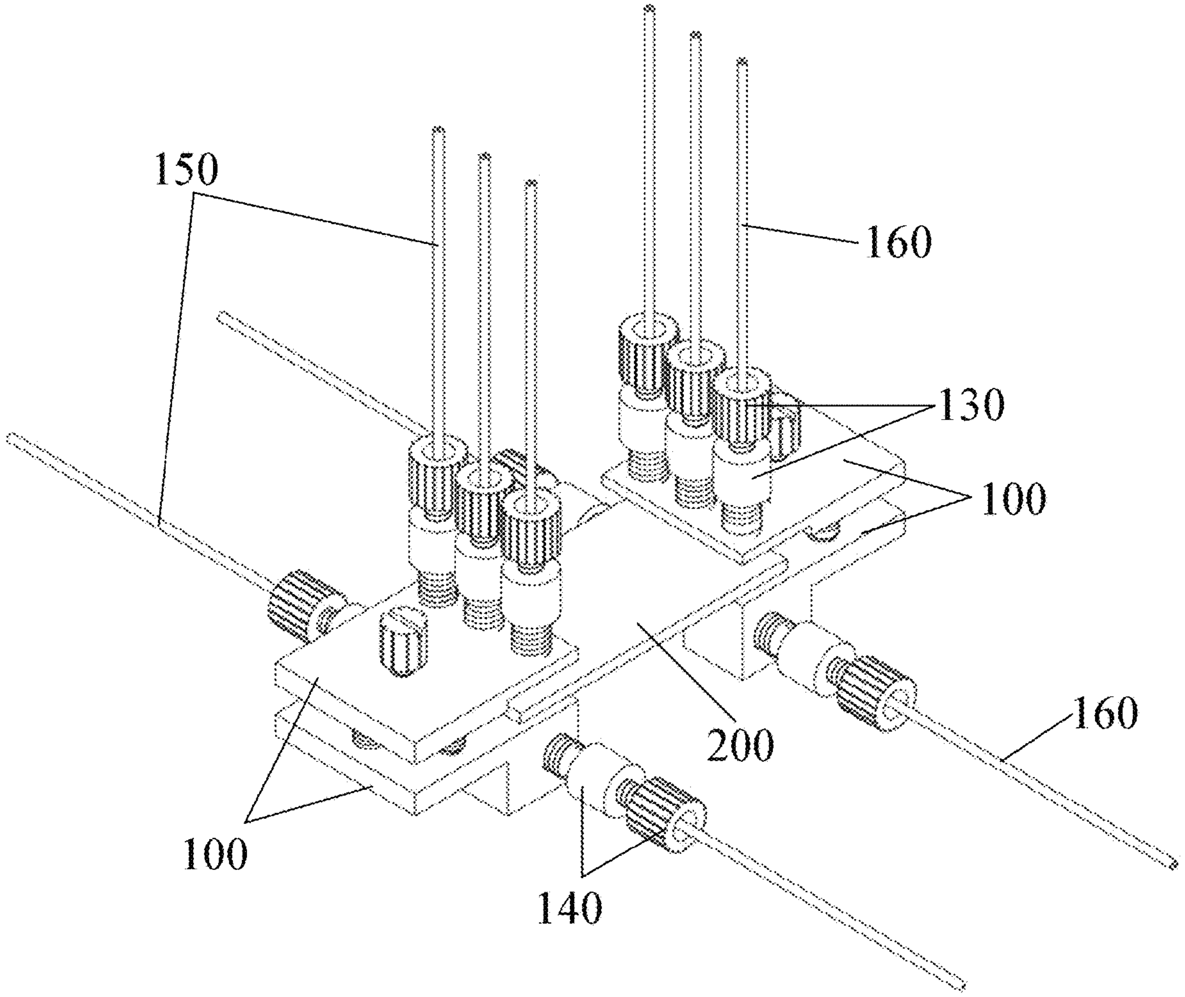
FIG. 2 is a schematic diagram of the three-dimensional structure of the fixing clamp shown in FIG. 1 after being assembled.
Figure 3:
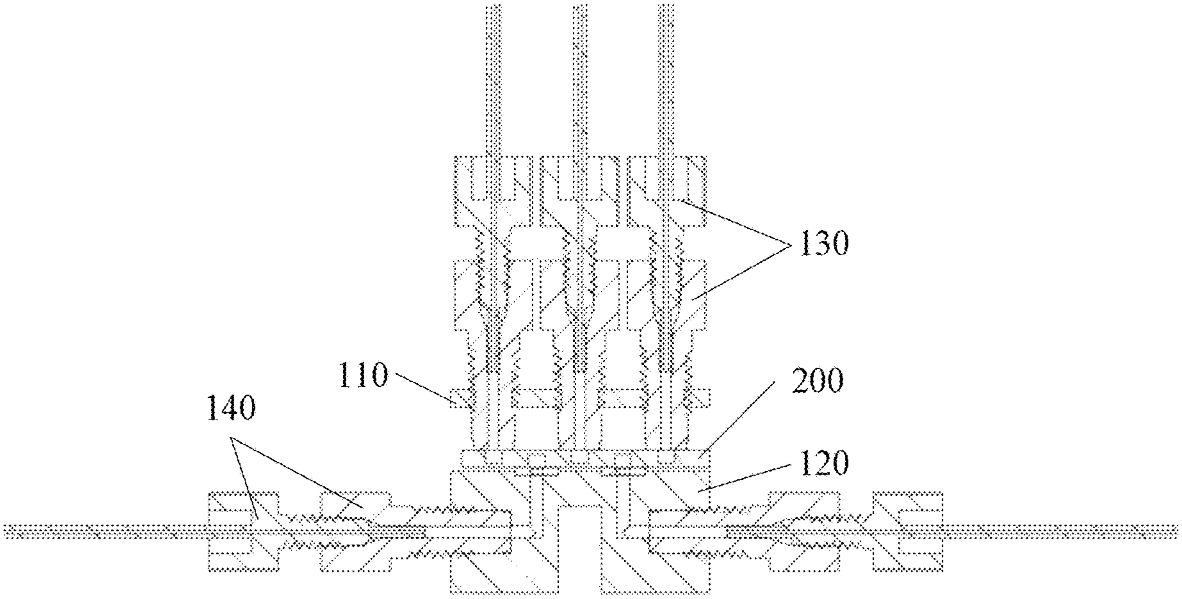
FIG. 3 is a schematic sectional structural diagram of the fixing clamp shown in FIG. 2.

The correspondence between reference signs and component names in FIGS. 1 to 3 is as follows:

100—sub-clamp, 110—upper plate body, 111—first passage, 120—lower plate body, 121—second passage, 130—upper pipeline connecting joint, 140—lower pipeline connecting joint, 150—input conduit, 160—output conduit, 170—sealing ring, 180—connecting bolt, 191—support spring, 192—guide post, 200—microfluidic chip, 210—connecting port, 310—male joint, 320—female joint.

DETAILED DESCRIPTION

In order to make the purposes, technical schemes and advantages of this application clearer, the embodiments of this application will be described in detail below with reference to the drawings. It should be noted that the embodiments in the present application and the features in the embodiments can be arbitrarily combined with each other if there is no conflict.

Many specific details are set forth in the following description in order to fully understand this application, but this application can be implemented in other ways different from those described here. Therefore, the protection scope of this application is not limited by the specific embodiments disclosed below.

As shown in FIGS. 1 to 3, a fixing clamp for a microfluidic chip provided by an embodiment of the present disclosure includes two sub-clamps 100 arranged to be spaced apart on left and right. Each of the sub-clamps 100 includes an upper plate body 110 having a first passage 111, the first passage 111 having a first outer interface 1111 and a first chip docking port knot conveniently shown in the figures) located on a lower surface of the upper plate body 110 and at one end of the upper plate body 110 facing the other sub-clamp 100; a lower plate body 120 having a second passage 121, the second passage 121 having a second outer interface 1211 and a second chip docking port 1212 located on an upper surface of the lower plate body 120 and at one end of the lower plate body 120 facing the other sub-clamp 100; and a spacing adjusting mechanism for connecting the upper plate body 110 and the lower plate body 120 together and adjusting a spacing between the upper plate body 110 and the lower plate body 120.

In the fixing clamp for a microfluidic chip, the first chip docking ports are located on the lower surfaces of the opposite ends of two upper plate bodies 110, and the second chip docking ports 1212 are located on the upper surfaces of the opposite ends of two lower plate bodies 120, so that when the microfluidic chip 200 is manufactured, a plurality of connecting ports 210 at the left end thereof are distributed on the upper and lower surfaces at the left end and a plurality of connecting ports 210 at the right end are distributed on the upper and lower surfaces at the right end. The connecting ports 210 on the upper surface and the connecting ports 210 on the lower surface are mutually unrestricted, and can be arranged more compactly, so that the area of the microfluidic chip 200 can be reduced and the experimental cost of the microfluidic chip is reduced.

In an embodiment, as shown in FIG. 1 to FIG. 3, the first chip docking port and the second chip docking port 1212 are located in the same row in a left-right direction, which reduces an arrangement space of the first chip docking port and the second chip docking port in a left-right direction, and reduces a length range occupied by the arrangement area of the connecting ports 210 on the microfluidic chip 200 in the left-right direction of the microfluidic chip 200, thus effectively reducing the size of the microfluidic chip 200 in the left-right direction.

Furthermore, as shown in FIG. 1 to FIG. 3, the first chip docking port and the second chip docking port 1212 are arranged in a staggered manner in a front-rear direction, so that it is easier to correspondingly communicate with different channels in the microfluidic chip 200, and the channels in the microfluidic chip 200 can be designed more compactly, thus reducing the occupied space and better reducing the area of the microfluidic chip 200.

Specifically, as shown in FIGS. 1 to 3, the first passage 111 includes a plurality of mutually independent first passages and the second passage 121 includes a plurality of mutually independent second passages. A plurality of first chip docking ports and a plurality of second chip docking ports 1212 are located in the same row in the left-right direction and alternately arranged in the front-rear direction. When the connecting ports 210 of adjacent channels in the microfluidic chip 200 are arranged, the connecting ports 210 of one channel are configured to be arranged on the upper surface of the microfluidic chip 200, and the connecting ports 210 of the other channel are arranged on the lower surface of the microfluidic chip 200, thus eliminating the problem of the requirement of interval between the connecting ports 210 of the adjacent channels. At this time, the distances between two connecting ports 210 adjacent to each other in front and back on the upper surface and between two connecting ports 210 adjacent to each other in front and back on the lower surface meet the interval requirement (specifically, there is one connecting port 210 on the lower surface between two connecting ports 210 adjacent to each other in front and back on the upper surface, which can meet the requirement of "certain interval" in related technologies). The space occupied by the connecting ports 210 on the microfluidic chip 200 is relatively reduced, so that the size of the microfluidic chip 200 required by the fixing clamp in the front-rear direction and the left-right direction is smaller, which can reduce the experimental cost of the microfluidic chip 200.

In an embodiment, the first outer interface 1111 can be located on a side or top or other surface of the upper plate body 110, and the second outer interface 1211 can be located on a side or bottom or other surface of the lower plate body 120, both of which can achieve the purpose of the present application, do not deviate from the design concept of the present disclosure, which will not be described in detail here, and should be within the protection scope of the present application.

Specifically, as shown in FIG. 1 to FIG. 3, there are three first chip docking ports on the upper plate body 110 and two second chip docking ports 1212 on the lower plate body 120. The first outer interface 1111 is located on the top surface of the upper plate body 110, and the first passage 111 is configured as a vertical hole. The second outer interface 1211 is located on the side surface of the lower plate body 120, and the second passage 121 is configured as a right-angle hole. The lower plate body 120 is directly placed on the table surface for supporting the whole fixing clamp.

In addition, as shown in FIG. 1 to FIG. 3, each sub-clamp 100 further includes an upper pipeline connecting joint 130 installed at the first outer interface 1111; and a lower pipeline connecting joint 140 installed at the second outer interface 1211. The upper pipeline connecting joint 130 and the lower pipeline connecting joint 140 are both configured as Luer joints. The female joint 320 of the Luer joint is screwed and fixed through an external thread, and the male joint 310 of the Luer joint is screwed into the female joint 320 of the Luer joint and connected with a conduit. The female joint 320 can be fixed on the upper plate body or the lower plate body first, and then the male joint 310 is installed on the female joint 320. The conduit connected to the sub-clamp 100 at the left can be used as an input conduit 150, and the conduit connected to the sub-clamp 100 at the right can be used as an output conduit 160, which can be reasonably selected by a person skilled in the art according to actual needs. The number of these five sets of conduits (ten in total) used can be selected according to the experimental requirement, which can be all used or only a part used (such as only one, two, three or four sets).

Specifically, as shown in FIG. 1 to FIG. 3, one end of the upper pipeline connecting joint 130 is fixed to the first chip docking port from the first outer interface 1111 along the first passage 111, and is in tight butting with the connecting port 210 on the upper surface of the microfluidic chip 200 through a sealing ring 170, and the second chip docking port 1212 is in tight butting with the connecting port 210 on the lower surface of the microfluidic chip 200 through the sealing ring 170, so as to ensure the tightness and prevent the problem of the liquid leakage during the experiment. In addition, the two ends of the microfluidic chip 200 are not in contact with the upper plate body 110 and the lower plate body 120, thereby reducing the wear of the microfluidic chip 200. The sealing ring 170 can be a silicone ring, a rubber ring or a fluorine ring and the like.

By means of this fixing clamp, the microfluidic chip does not need to be installed repeatedly in repeated experiments of the same microfluidic chip, and the fluid enters the microfluidic chip by itself along the input conduit, so that the liquid inlet space is small (dead volume is small), and the microfluidic chip can withstand a certain pressure and speed of liquid. Moreover, most of the area of the microfluidic chip is unobstructed during the experiment, it can be applied to various modes such as a normally-placed microscope and an inversely-placed microscope, and is more conducive to the observation of the experiment.

In an embodiment, as shown in FIGS. 1 and 2, the spacing adjusting mechanism includes a connecting bolt 180, the threaded end of which being passed through one of the upper plate body 110 and the lower plate body 120 and screwed on the other of the upper plate body 110 and the lower plate body 120; and a support spring 191, which is supported between the upper plate body 110 and the lower plate body 120 so that one of the upper plate body 110 and the lower plate body 120 abuts against a nut of the connecting bolt 180. By screwing the connecting bolt 180, the spacing between the upper plate body 110 and the lower plate body 120 can be adjusted, so that the upper plate body 110 and the lower plate body 120 can elastically clamp the ends of the microfluidic chip 200 and correspondingly are in sealed communication with an internal channels of the microfluidic chip 200.

Specifically, as shown in FIGS. 1 and 2, the spacing adjusting mechanism further includes a guide post 192 which penetrates one of the upper plate body 110 and the lower plate body 120 and is fixedly connected with the other of the upper plate body 110 and the lower plate body 120, and the support spring 191 is sleeved on the guide post 192. There are a plurality of sets of the guide posts 192 and a plurality of sets of the support springs 191, all of which are uniformly distributed on the front and back sides of the connecting bolt 180, so that the upper plate body 110 and the lower plate body 120 are more evenly stressed in various positions and can better elastically clamp the microfluidic chip 200.

The upper plate body and the lower plate body can be made of stainless steel, glass or high molecular polymer and the like, and can be manufactured by lathe machining, laser cutting or injection molding and the like.

In an embodiment, the first chip docking port and the second chip docking port are located in the same row in a left-right direction.

In an embodiment, the first chip docking port and the second chip docking port are arranged in a staggered manner in a front-rear direction.

In an embodiment, the first passage includes a plurality of mutually independent first passages and the second passage includes a plurality of mutually independent second passages, and a plurality of the first chip docking ports and a plurality of the second chip docking ports are located in the same row in the left-right direction and alternately arranged in the front-back direction.

In an embodiment, the first outer interface is located on a side or top surface of the upper plate body, and the second outer interface is located on a side or bottom surface of the lower plate body.

In an embodiment, each of the sub-clamps further includes an upper pipeline connecting joint installed at the first outer interface; and a lower pipeline connecting joint installed at the second outer interface.

In an embodiment, one end of the upper pipeline connecting joint is fixed to the first chip docking port from the first outer interface along the first passage for tight butting with the connecting port on the upper surface of the microfluidic chip, and the second chip docking port is configured for tight butting with the connecting port on the lower surface of the microfluidic chip.

In an embodiment, the upper pipeline connecting joint and the lower pipeline connecting joint are both Luer joints.

In an embodiment, the spacing adjusting mechanism includes a connecting bolt, a threaded end of which being passed through one of the upper plate body and the lower plate body and screwed on the other of the upper plate body and the lower plate body; and a support spring supported between the upper plate body and the lower plate body so that one of the upper plate body and the lower plate body abuts against a nut of the connecting bolt.

In an embodiment, the spacing adjusting mechanism further includes a guide post which penetrates one of the upper plate body and the lower plate body and is fixedly connected with the other of the upper plate body and the lower plate body, and the support spring is sleeved on the guide post.

Compared with the prior art, in the fixing clamp for a microfluidic chip provided by embodiments of the present disclosure, the first chip docking ports are located on the lower surfaces of the opposite ends of the two upper plate bodies, and the second chip docking ports are located on the upper surfaces of the opposite ends of the two lower plate bodies, so that when the microfluidic chip is manufactured, a plurality of connecting ports at the left end are distributed on the upper and lower surfaces at the left end, and a plurality of connecting ports at the right end are distributed on the upper and lower surfaces at the right end, and the connecting ports on the upper surface and the connecting ports on the lower surface are mutually unrestricted and can be arranged more compactly. Therefore, the area of the microfluidic chip can be reduced, and the experimental cost of the microfluidic chip is reduced.

To sum up, in the fixing clamp for a microfluidic chip provided by embodiments of the present disclosure, the first chip docking ports are located on the lower surfaces of the opposite ends of the two upper plate bodies, and the second chip docking ports are located on the upper surfaces of the opposite ends of the two lower plate bodies, so that when the microfluidic chip is manufactured, a plurality of connecting ports on the left end thereof are distributed on the upper and lower surfaces at the left end, and a plurality of connecting ports on the right end are distributed on the upper and lower surfaces at the right end, and the connecting ports on the upper surface and the connecting ports on the lower surface are mutually unrestricted and can be arranged more compactly. Therefore, the area of the microfluidic chip can be reduced, and the experimental cost of the microfluidic chip is reduced.

In the description of the application, the terms “install”, “communicate”, “connect” and “fix” and the like should be understood in a broad sense. For example, “connect” can be a fixed connection, a detachable connection or an integrated connection; and it may mean a direct connection or an indirect connection through an intermediate medium. For a person ordinary skill in the art, the specific meanings of the above terms in this application can be understood according to specific situations.

In the description of this specification, the descriptions of the terms “one embodiment”, “some embodiments”, “specific embodiments” and the like mean that specific features, structures, materials or characteristics described in connection with the embodiment(s) or example(s) are included in at least one embodiment or example herein. In this specification, the schematic expressions of the above terms do not necessarily refer to the same embodiment or example. Furthermore, the specific features, structures, materials or characteristics described may be combined in any one or more embodiments or examples in a suitable manner.

Although the embodiments disclosed herein are as above, they are embodiments adopted only for the convenience of understanding the application, and are not intended to limit this application. Without departing from the spirit and scope disclosed herein, any person skilled in the art to which the application pertains can make any modifications and changes in the implementation forms and details, but the scope of patent protection herein shall still be subject to the scope defined by the appended claims.

What we claim is:

1. A fixing clamp for a microfluidic chip, comprising a set of sub-clamps arranged to be spaced apart on left and right, and each of the sub-clamps comprising:

an upper plate body with a first passage, the first passage having a first outer interface and a first chip docking port, and the first chip docking port being located on a lower surface of the upper plate body and at one end of the upper plate body facing the other sub-clamp;

a lower plate body with a second passage, the second passage having a second outer interface and a second chip docking port, and the second chip docking port being located on an upper surface of the lower plate body and at one end of the lower plate body facing the other sub-clamp; and a spacing adjusting mechanism connecting the upper plate body and the lower plate body together for adjusting a spacing between the upper plate body and the lower plate body.

2. The fixing clamp for a microfluidic chip according to claim 1, wherein the first chip docking port and the second chip docking port are located in the same row in a left-right direction.

3. The fixing clamp for a microfluidic chip according to claim 2, wherein each of the sub-clamps further comprises:

an upper pipeline connecting joint installed at the first outer interface; and a lower pipeline connecting joint installed at the second outer interface.

4. The fixing clamp for a microfluidic chip according to claim 3, wherein, one end of the upper pipeline connecting joint is fixed to the first chip docking port from the first outer interface along the first passage for tight butting with a connecting port on an upper surface of the microfluidic chip, and the second chip docking port is configured for tight butting with a connecting port on a lower surface of the microfluidic chip.

5. The fixing clamp for a microfluidic chip according to claim 2, wherein the spacing adjusting mechanism comprises:

a connecting bolt, a threaded end of which being passed through one of the upper plate body and the lower plate body and screwed on the other of the upper plate body and the lower plate body; and a support spring supported between the upper plate body and the lower plate body so that one of the upper plate body and the lower plate body abuts against a nut of the connecting bolt.

6. The fixing clamp for a microfluidic chip according to claim 5, wherein the spacing adjusting mechanism further comprises:

a guide post which penetrates one of the upper plate body and the lower plate body and is fixedly connected with the other of the upper plate body and the lower plate body, and wherein the support spring is sleeved on the guide post.

7. The fixing clamp for a microfluidic chip according to claim 1, wherein the first chip docking port and the second chip docking port are arranged in a staggered manner in a front-rear direction.

8. The fixing clamp for a microfluidic chip according to claim 7, wherein each of the sub-clamps further comprises:

an upper pipeline connecting joint installed at the first outer interface; and a lower pipeline connecting joint installed at the second outer interface.

9. The fixing clamp for a microfluidic chip according to claim 7, wherein the spacing adjusting mechanism comprises:

a connecting bolt, a threaded end of which being passed through one of the upper plate body and the lower plate body and screwed on the other of the upper plate body and the lower plate body; and a support spring supported between the upper plate body and the lower plate body so that one of the upper plate body and the lower plate body abuts against a nut of the connecting bolt.

10. The fixing clamp for a microfluidic chip according to claim 1, wherein the first passage comprises a plurality of mutually independent first passages and the second passage comprises a plurality of mutually independent second passages, and a plurality of the first chip docking ports and a plurality of the second chip docking ports are located in the same row in a left-right direction and alternately arranged in a front-rear direction.

11. The fixing clamp for a microfluidic chip according to claim 10, wherein each of the sub-clamps further comprises:

an upper pipeline connecting joint installed at the first outer interface; and a lower pipeline connecting joint installed at the second outer interface.

12. The fixing clamp for a microfluidic chip according to claim 10, wherein the spacing adjusting mechanism comprises:

a connecting bolt, a threaded end of which being passed through one of the upper plate body and the lower plate body and screwed on the other of the upper plate body and the lower plate body; and a support spring supported between the upper plate body and the lower plate body so that one of the upper plate body and the lower plate body abuts against a nut of the connecting bolt.

13. The fixing clamp for a microfluidic chip according to claim 1, wherein the first outer interface is located on a side or top surface of the upper plate body, and the second outer interface is located on a side or bottom surface of the lower plate body.

14. The fixing clamp for a microfluidic chip according to claim 13, wherein each of the sub-clamps further comprises:

an upper pipeline connecting joint installed at the first outer interface; and a lower pipeline connecting joint installed at the second outer interface.

15. The fixing clamp for a microfluidic chip according to claim 13, wherein the spacing adjusting mechanism comprises:

a connecting bolt, a threaded end of which being passed through one of the upper plate body and the lower plate body and screwed on the other of the upper plate body and the lower plate body; and a support spring supported between the upper plate body and the lower plate body so that one of the upper plate body and the lower plate body abuts against a nut of the connecting bolt.

16. The fixing clamp for a microfluidic chip according to claim 1, wherein each of the sub-clamps further comprises:

an upper pipeline connecting joint installed at the first outer interface; and a lower pipeline connecting joint installed at the second outer interface.

17. The fixing clamp for a microfluidic chip according to claim 16, wherein, one end of the upper pipeline connecting joint is fixed to the first chip docking port from the first outer interface along the first passage for tight butting with a connecting port on an upper surface of the microfluidic chip, and the second chip docking port is configured for tight butting with a connecting port on a lower surface of the microfluidic chip.

18. The fixing clamp for a microfluidic chip according to claim 17, wherein the upper pipeline connecting joint and the lower pipeline connecting joint are both Luer joints.

19. The fixing clamp for a microfluidic chip according to claim 1, wherein the spacing adjusting mechanism comprises:

a connecting bolt, a threaded end of which being passed through one of the upper plate body and the lower plate body and screwed on the other of the upper plate body and the lower plate body; and a support spring supported between the upper plate body and the lower plate body so that one of the upper plate body and the lower plate body abuts against a nut of the connecting bolt.

20. The fixing clamp for a microfluidic chip according to claim 19, wherein the spacing adjusting mechanism further comprises:

a guide post which penetrates one of the upper plate body and the lower plate body and is fixedly connected with the other of the upper plate body and the lower plate body, and wherein the support spring is sleeved on the guide post.

* * * * *